May 31, 1960 R. W. JENSEN ET AL 2,938,533
SHUTOFF VALVE
Filed Dec. 4, 1956
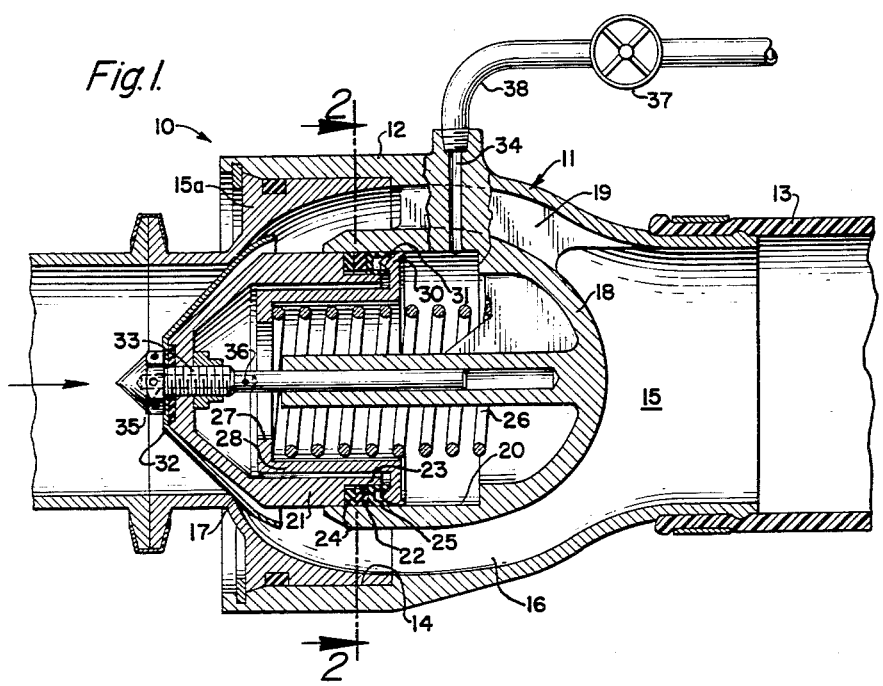
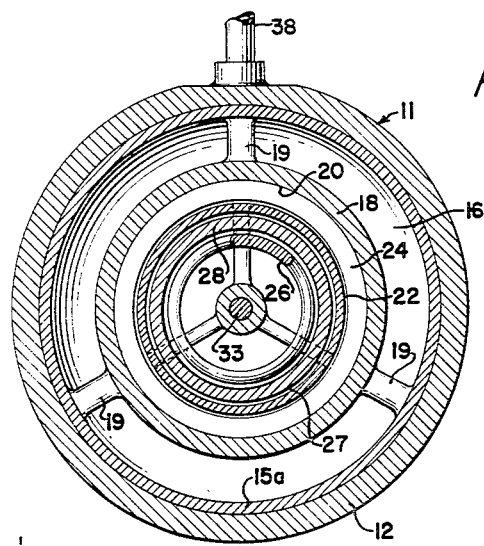
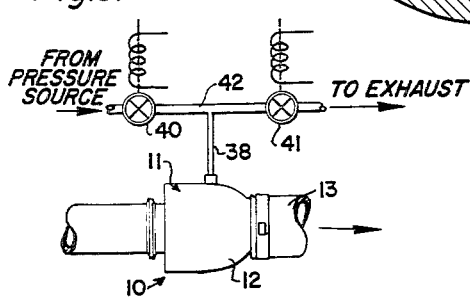
RAYMOND W. JENSEN,
JAMES H. RILEY,
INVENTORS.
BY John H. M. Wallace United States Patent Office 2,938,533
Patented May 31, 1960

2,938,533
SHUTOFF VALVE

Raymond W. Jensen, Phoenix, Ariz., and James Hampton Riley, Inglewood, Calif., assignors to The Garrett Corporation, Los Angeles, Calif., a corporation of California Filed Dec. 4, 1956, Ser. No. 626,215

4 Claims. (Cl. 137—219)

This invention relates generally to apparatus for controlling the flow of fluids through conduits and is more particularly directed to a shutoff valve adapted to be positioned in a conductor to control the flow of air or similar fluid therethrough.

An object of this invention is to provide a flow-control or shutoff valve having an element disposed for movement relative to a seat and responsive to pressure differences at opposite sides thereof to move to control fluid flow past such seat.

Another object of the invention is to provide a valve mechanism having a piston operated valve element and means for varying fluid pressures applied to opposed portions of the piston and/or valve element to effect movement thereof, a novel resilient sealing means being provided on said valve element to secure a more effective action thereof.

Still another object of the invention is to provide a valve mechanism having a body which forms a passage with a concentric valve seat and contains a piston chamber for receiving a valve actuating piston, novel piston sealing means being provided and the forces employed to operate the piston being used to improve the efficiency of the piston sealing means.

Another object of the invention is to provide a valve mechanism having a body for forming a passage with a concentric valve seat, a valve element for movement relative to the seat and a means for actuating the valve element, means being provided to equalize fluid pressures at opposite sides of the valve actuating means at predetermined times and relieve pressures on parts thereof at other times, resilient means being provided to urge the valve actuating means in a valve seating direction when the fluid pressures are equalized, the resilient means employed being of such power that fluid pressures in excess of a predetermined value will move the valve actuating means in a valve unseating direction when the pressures are relieved on certain parts, the resilient means serving the second purpose of applying a force to piston sealing means to render it more effective.

An object also is to provide a valve mechanism of the character set forth in the preceding paragraph in which the seat engaging portion of the valve element comprises a flexible, partially conical member supported at one point by the valve actuating means so that any inaccuracy or misalignment of the parts will be compensated for by self-alignment of the conical member, the actuating member constituting a piston with a cross-sectional area in excess of the area encompassed by the valve seat whereby fluid pressure at the inlet side of the seat may be employed to urge the flexible conical member into engagement with the seat under a force greater than that exerted by the inlet pressure on the conical member to move it away from such seat.

Other objects and advantages of the invention will be made apparent by the following description and the accompanying drawing in which one embodiment of the invention has been illustrated in detail.

In the drawings,

Fig. 1 is a longitudinal sectional view taken through a valve formed in accordance with the present invention;

Fig. 2 is a vertical transverse sectional view taken through the valve shown in Fig. 1 on the plane indicated by the line 2—2 of Fig. 1; and Fig. 3 is a diagrammatic view illustrating a modified method of actuating the valve.

Referring more particularly to the drawing, the numeral 10 indicates the valve in its entirety. In the present instance, the valve is formed for disposition in a conduit. The valve includes a body 11 having two parts, the main part 12 being relatively large in diameter at one end and of a size to fit into a conduit 13 of smaller diameter at the other end. The larger end of the body is bored, as at 14, to receive the second part 15a of the body. This part is provided with a groove for receiving a sealing element, while the body part 12 is formed with an internal groove for receiving a snap ring employed to hold the body parts together. When the body parts are assembled, they form a passage 15 with an enlargement 16 intermediate the ends thereof.

The second body part provides a valve seat 17 adjacent the inlet end of the enlargement or chamber 16. The body section 12 has a portion 18 supported in the chamber 16 by one or more radially extending webs 19, the portion 18 being bored to form a piston chamber 20. This chamber is disposed substantially in registration with or concentric to the seat 17. The open end of the piston chamber faces the inlet end of the passage 15 and is formed to receive a piston 21 which is of hollow construction and has an external groove 22 formed at the end of the skirt 23, the groove being provided to receive piston ring and a sealing member 24 and 25, respectively. The end of the piston adjacent the inlet end of the valve body is closed by a wall which, in this instance, is of frusto-conical formation for a purpose which will be obvious from the following description.

The piston 21 is movable in the piston chamber toward and away from the valve seat. It is urged in the former direction by a coil spring 26 disposed between the inner end of the piston chamber and a packing follower 27 disposed at the inner end of the piston. This packing follower has a cylindrical portion 28 which extends into the hollow piston and is provided at its inner end with an internal flange for engagement by one end of the spring 26. At its opposite end the follower has an external flange 30, one side of which is formed with a V-shaped bead 31 for engaging and spreading the flanges of the sealing member 25. The latter member is of substantially U-shaped cross section, the outer leg of the U-shape being urged into engagement with the inner wall of the piston chamber by the bead 31. The force of the spring 26 which tends to move the piston toward the valve seat also serves to spread the sealing member and cause fluid-tight engagement of the outer wall thereof with the piston chamber wall. The spring thus serves two purposes.

One of the features of this invention is to provide a novel sealing nose element 32 at the end of the piston for engagement with the valve seat. The sealing element 32 is also of frusto-conical formation, being formed of suitable material, such as stainless steel, with a predetermined degree of flexibility. At its central portion, the sealing element 32 has an opening through which a threaded fastening element 33 extends to secure the sealing element on the forward wall of the piston. The included angles of the forward wall of the piston and the sealing element 32 are slightly different so that the sealing element will be spaced from the forward wall of the piston except at the point or area where it is supported thereon.

A passage 34 extends from the piston chamber through one of the webs 19 to the exterior of the body part 12. A second passage 35, having a restriction 36 therein, extends through the fastening element from the inlet end or side of the sealing element to the piston chamber. When the valve forming the invention is disposed in a conduit, fluid introduced to the inlet end thereof may flow through the passage 35, at a rate determined in part by the orifice 36, to the piston chamber. This fluid may be prevented from flowing out of the piston chamber through passage 34 by a suitable valve 37 disposed in a line 38 leading from the outer end of the passage 34.

When valve 37 is closed, fluid pressure in the piston chamber will build up to equalize pressure in the inlet end of the passage 15, and spring 26 will urge the piston in a direction to cause the sealing element to engage the seat and prevent fluid flow through the valve 10. It will be noted that the diameter of the piston chamber is such that the cross-sectional area will exceed the area encompassed by the valve seat. Since part of the forward wall of the piston is exposed to the pressure existing in the passage 15 at the downstream side of the valve seat, the piston will be urged toward a seat engaging position by fluid pressure in addition to the spring force. The sealing element will thus be urged into a more effective sealing engagement with the valve seat.

When it is desired to permit fluid flow through the fluid passage 15, valve 37 may be opened to permit fluid to bleed from the piston chamber until the fluid pressure at the inlet end of the passage 15 will exert sufficient force against the sealing element to move the piston in opposition to the force of spring 26 and space the sealing element from the valve seat. To return the valve to a closed position, the bleed valve in line 38 will be closed permitting pressure to again build up in the piston chamber to equalize that in the inlet end of passage 15.

It will be obvious that the piston could be actuated by supplying fluid under pressure to the piston chamber through passage 34. If this method of operation is employed, the passage in the fastening element may be eliminated and a pair of valves, as shown diagrammatically in Fig. 3, may be employed. Fluid pressure from an external source may be utilized to actuate the valve in this manner.

As diagrammatically illustrated in Fig. 3, two suitably actuated valves 40 and 41 may be positioned in a line 42 communicating with line 38 leading from the piston chamber. The valve 40 may be opened while valve 41 is closed to admit fluid pressure to the piston chamber to cause the piston to move the valve element 32 into engagement with the seat. When it is desired to open the main valve, valve 40 may be closed and valve 41 opened to bleed the fluid from the piston chamber and permit fluid pressure in the inlet end of the passage 15 to move the piston 21 and withdraw the sealing element from the seat. While two valves 40 and 41 have been illustrated in line 42, a double-acting valve could be employed at the juncture of lines 38 and 42 for the same purpose.

While the invention has been shown in a single form, it should be obvious that many minor changes may be made in the construction and relation of parts without departing from the spirit and scope of the invention.

We claim:

1. A valve comprising a body forming a passage with an annular seat, said body having a portion disposed in said passage and forming a piston chamber; a piston valve element disposed in said piston chamber for movement toward and away from said seat, said piston valve element having a conical wall facing said seat; a frusto-conical sealing element formed of flexible sheeet material supported at the central portion thereof on said piston valve element for engagement with said seat, the included angle of the conical portion of said sealing element being different than the included angle of the conical wall of said piston valve element; and passage means for varying fluid pressures at opposite ends of said piston valve element to effect movement thereof.

2. A valve comprising a body forming a passage with a concentric seat, said body having a portion disposed in said passage and forming a piston chamber substantially in axial registration with said seat, the cross-sectional area of said piston chamber exceeding that encompassed by said seat; piston means disposed in said piston chamber for movement toward and away from said seat, said piston means having a frusto-conical end facing said seat; a partially conical flexible sealing element supported adjacent the center thereof on said piston means for engagement with said seat, the included angle of the conical portion of said sealing element being greater than the included angle of the conical end of said piston means; means forming a restricted inlet for admitting fluid under pressure to said piston chamber to urge said piston and sealing element toward said seat; and additional means providing a bleed passage for relieving said piston chamber of fluid pressure, fluid pressure in the inlet end of said body passage tending to move said piston and sealing element away from said seat when pressure in said piston chamber is relieved.

3. A valve comprising a first body part forming a passage with an enlarged bore at one end, said first body part having a portion disposed in said passage and forming a piston chamber; a second body part removably disposed in said bore, said second body part providing an inlet to said passage and a seat substantially concentric with said piston chamber; piston means disposed in said piston chamber for movement toward and away from said seat, said piston means having a conical wall facing said seat; a relatively thin walled, substantially conical flexible sealing element supported at the central portion thereof on said piston means for engagement with said seat, the included angle of the conical portion of said sealing element being greater than the included angle of the conical wall of said piston means; means forming a restricted passage to admit fluid pressure from the passage inlet to said piston chamber to equalize pressures on opposite sides of said piston; resilient means engaging said piston means to move the latter and said sealing element toward said seat when pressures on opposite sides of said piston are equalized; and additional means providing a bleed passage for relieving said piston chamber of fluid pressure, the fluid pressure in said body passage inlet serving to move said piston and sealing element away from said seat when fluid pressure in said piston chamber is relieved.

4. A valve comprising: a first body element with inner and outer parts spaced to form an annular passage which converges to a circular cross section at one end of said body element, the outer part of said body element being counterbored at the opposite end, the inner part of said body element forming a piston chamber opening to the counterbored end of said body element; a second body element removably disposed in the counterbore of said first element, said second body element forming a valve seat substantially concentric with said piston chamber; an annular member removably disposed in the outer part of said first body element to retain said second body element in said counterbore; a piston valve disposed in said piston chamber for movement toward and away from said valve seat, said piston valve having a substantially conical wall facing said valve seat; a substantially conical seat engaging member secured to the center portion of the conical wall on said piston valve, the included angle of the conical portion of said member being greater than that of the conical wall on said piston valve; and means yieldably urging said piston valve toward said seat, said piston valve being responsive to fluid pressure under predetermined conditions to move away from said seat in opposition to said urging means.

(References on following page)

References Cited in the file of this patent

UNITED STATES PATENTS

| | | | |
|---|---|---|---|
| 845,063 | Desper | Feb. 26, | 1907 |
| 1,801,049 | Larner | Apr. 14, | 1931 |
| 2,059,729 | Dick | Nov. 3, | 1936 |
| 2,192,499 | Larner | Mar. 5, | 1940 |
| 2,257,209 | Wells | Sept. 30, | 1941 |
| 2,330,881 | Gora | Oct. 5, | 1943 |
| 2,351,873 | Parker | June 20, | 1944 |
| 2,571,538 | Christensen | Oct. 16, | 1951 |